(No Model.)
J. WEILE.
TOOTH CLEANING INSTRUMENT.
No. 555,139. Patented Feb. 25, 1896.
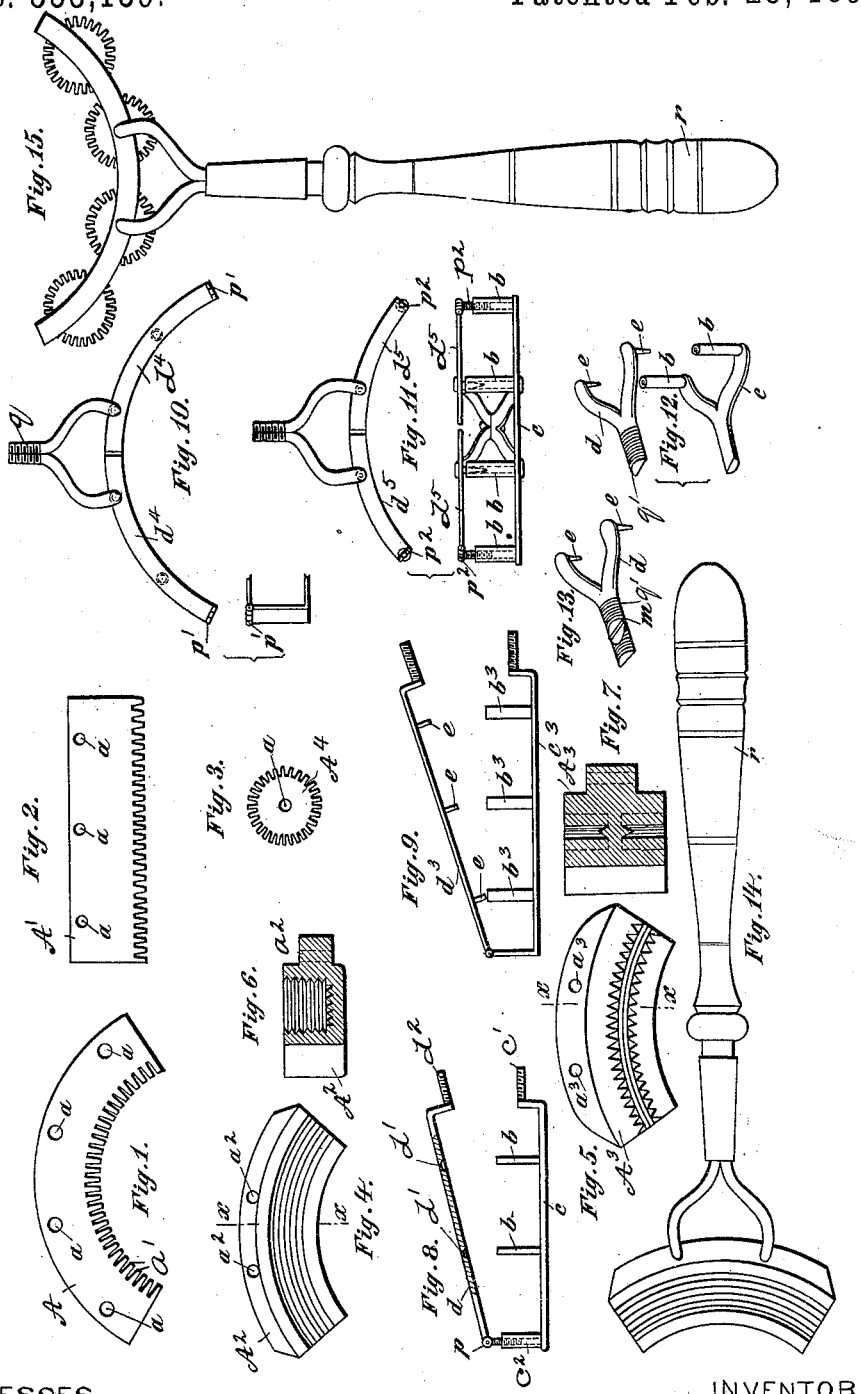
WITNESSES
INVENTOR

UNITED STATES PATENT OFFICE.

JENS WEILE, OF PISA, ITALY.

TOOTH-CLEANING INSTRUMENT.

SPECIFICATION forming part of Letters Patent No. 555,139, dated February 25, 1896.

Application filed October 30, 1894. Serial No. 527,439. (No model.)

*To all whom it may concern:*

Be it known that I, JENS WEILE, of Pisa, in the Province of Pisa and Kingdom of Italy, have invented a new and useful Tooth-Cleaning Instrument, of which the following is a specification, reference being had to the accompanying drawings, which illustrate several forms in which I have contemplated embodying my invention, and said invention is fully disclosed in the following description and claims.

Referring to the said drawings, Figure 1 is a plan view of a tooth-cleaning device embodying my invention. Figs. 2, 3, 4, and 5 are similar views of slightly-modified forms of the same. Fig. 6 represents a section on line $x\ x$ of Fig. 4. Fig. 7 represents a section on line $x\ x$ of Fig. 5. Fig. 8 is a side elevation, partly in section, of a holder for one of the tooth-cleaning devices shown in Figs. 4 or 5. Fig. 9 is a similar view of a holder adapted to hold the tooth-cleaning device shown in Fig. 2. Fig. 10 is a top plan view of a holder adapted to hold the form of tooth-cleaning device shown in Fig. 1. Figs. 11, 12, 13, and 14 are views of slightly-modified forms of holders. Fig. 15 is a plan view of another form of holder for holding a series of tooth-cleaning devices of the form illustrated in Fig. 3.

The object of my invention is to provide a tooth-cleaning device which can be very cheaply made, which will thoroughly clean the teeth without injuring the enamel thereof and which can be kept in an antiseptic solution when not in use.

The cleaning device proper is made of india-rubber, preferably toothed or serrated, and having its tooth-engaging portions arranged in a curve corresponding to the curvature of the teeth in the human mouth.

In Fig. 1 I have shown a cleaning device A in the curved shape just described and having the inner curved portion of the same provided with serrated portions $a'$. The device is also provided with a series of holes $a$, by means of which it can be secured to a suitable handle, as hereinafter described.

In Fig. 2 I have illustrated a cleaning device A' constructed similar to the device shown in Fig. 1, except that its cleaning-surface is arranged in a straight line; but this is not my preferred construction.

In Figs. 4 and 6 I have shown a curved cleaning device $A^2$ provided with a cleaning-recess, the walls of which follow the curvature of the teeth, the said walls and the bottom of said recess being serrated, as indicated in the drawings. In using this device it will be seen that both the front and rear sides of the teeth will be cleaned at the same time. This device $A^2$ is also provided with attaching-apertures $a^2$.

In Figs. 5 and 7 I have shown a cleaning device $A^3$ formed substantially like the device $A^2$ shown in Figs. 4 and 6, except that it has a tooth-receiving recess on both its upper and lower sides, so that the back and front faces of both rows of teeth may be cleaned simultaneously or without removing the instrument from the mouth or changing its position.

In Fig. 3 I have shown a cleaning device which consists of a serrated wheel or disk of rubber, and I prefer to employ two or more of these devices together in one holder.

In Fig. 8 I have shown one form of holder designed for securing one of the cleaning devices previously described to a suitable handle for operating the same. In this figure $c$ represents one plate of the holder, which is provided with a series of supporting studs or projections $b$, which engage the holes in the rubber cleaning devices. The plate $c$ is also provided with a semicylindrical shank $c'$, exteriorly screw-threaded. A movable plate $d$ is hinged or otherwise pivotally secured to the plate $c$ in such a manner that when in operative position it will lie parallel to the plate $c$ and will engage the ends of the securing-stud $b$. In this instance I have shown the plate $d$ pivotally connected with a screw-threaded stem $p$, which screws into a sleeve $c^2$ on the plate $c$, so that the plate $d$ may be adjusted toward and from the plate $c$. The plate $d$ is also provided in this instance with recesses $d'$, which engage the outer ends of the studs $b$, and said plate is also provided with a shank $d^2$ similar in all respects to the shank $c'$ on the plate $c$. When the two plates are closed and the screw-threaded shanks $d^2$ and $c'$ are brought together, a suitable handle, such as the handle $r$, (shown in Fig. 14,) is screwed upon said shank, thus securing the plates together and holding the cleaning device, which has previously been placed in engagement with the studs $b$. The plates $c$ and $d$ will be formed to correspond with the shape of the cleaning device which they are designed to hold.

In Fig. 9 I have shown a slightly-modified form of holder in which the pivoted plate $d^3$ is provided with pins $e$ to engage recesses in the studs $b^3$ of the plate $c^3$.

In Fig. 10 I have shown a modified form of holder in which the handle is to be attached centrally instead of at the end. The upper plate $d^4$ is made in two sections, hinged at $p'$ at opposite ends of the holder, each of said sections being provided with an arm having a screw-threaded portion to engage the handle.

Fig. 11 illustrates another modification of the holder constructed similar to the holder shown in Fig. 10, except that the sections $d^5$ of the upper plate are hinged to screw-threaded adjusting-rods $p^2$, as in Fig. 8.

Figs. 12 and 13 show smaller holders, the operation of which will be readily apparent.

Fig. 15 represents a holder in which each of the supporting-studs is provided with one of the cleaning devices shown in Fig. 3, the said devices being arranged in a curvilinear manner. In this form of my invention the toothed wheels are permitted to rotate as they are pressed against the teeth. The operation of the improved cleaning devices will be sufficiently apparent from the foregoing description.

What I claim, and desire to secure by Letters Patent, is—

1. As a new article of manufacture, a tooth-cleaning device consisting of a main body of elastic material having a curved groove conforming to the curvature of the teeth, the side walls and bottom of said groove being provided with integral serrated portions, substantially as described.

2. As a new article of manufacture, a tooth-cleaning device consisting of a main body of elastic material having on its upper and lower sides a curved groove, conforming to the curvature of the teeth, the side walls and bottom of each of said grooves being provided with integral serrated portions, substantially as described.

3. The combination with a tooth-cleaning device composed of elastic material, of a holder comprising two opposing plates adapted to engage said cleaning device, an adjustable hinged connection between said plates at one end and a handle provided with a clamping device for engaging parts connected with said plates at the other end, substantially as described.

4. The combination with a tooth-cleaning device composed of elastic material and provided with securing-apertures, of a holder comprising two pivotally-connected opposing plates, one of said plates having pins for engaging said securing-apertures and the other plate provided with recesses to receive the ends of said pins, and a handle provided with a clamping device for engaging parts connected with said plates, substantially as described.

In witness whereof I hereunto set my hand in presence of two witnesses.

JENS WEILE.

Witnesses:
 ALEX. S. ROSENTHAL,
 EMILIO MASI.